US012637237B2

(12) United States Patent
Khalil

(10) Patent No.: US 12,637,237 B2
(45) Date of Patent: May 26, 2026

(54) GAS STORAGE ACCUMULATORS FOR SPACECRAFT

(71) Applicant: Hamilton Sundstrand Space Systems International, Inc., Windsor Locks, CT (US)

(72) Inventor: Yehia F. Khalil, Glastonbury, CT (US)

(73) Assignee: HAMILTON SUNDSTRAND SPACE SYSTEMS INTERNATIONAL, INC., Windsor Locks, CT (US)

( * ) Notice: Subject to any disclaimer, the term of this patent is extended or adjusted under 35 U.S.C. 154(b) by 764 days.

(21) Appl. No.: 17/962,425

(22) Filed: Oct. 7, 2022

(65) Prior Publication Data

US 2024/0116657 A1    Apr. 11, 2024

(51) Int. Cl.
F17C 1/16      (2006.01)
B64G 1/46      (2006.01)

(52) U.S. Cl.
CPC .................. B64G 1/46 (2013.01); F17C 1/16 (2013.01); *F17C 2201/0109* (2013.01); *F17C 2203/0604* (2013.01); *F17C 2203/0624* (2013.01); *F17C 2203/066* (2013.01); *F17C 2203/0663* (2013.01); *F17C 2205/0323* (2013.01); *F17C 2221/011* (2013.01); *F17C 2221/012* (2013.01); *F17C 2221/013* (2013.01);
(Continued)

(58) Field of Classification Search
CPC ...... F17C 1/16; F17C 1/00; F17C 2203/0604; F17C 2203/06; F17C 2203/0621; F17C 2203/0624; F17C 2203/066; F17C 2203/0663; F17C 2203/0665; F17C 2203/0668; F17C 2203/067; F17C 2203/0673; F17C 2221/011; F17C 2221/012; F17C 2221/013; F17C 2221/014; F17C 2221/033; F17C 2270/0194; F17C 2270/025
See application file for complete search history.

(56) References Cited

U.S. PATENT DOCUMENTS 6,017,600 A    1/2000  Mitlitsky et al.
8,582,253 B1    11/2013  Zheng et al.
(Continued)

FOREIGN PATENT DOCUMENTS

CN        104152197 A    11/2014
EP          3549875 A1    10/2019
(Continued)

OTHER PUBLICATIONS

Abstract of EP3549875 (A1), Published: Oct. 9, 2019, 1 page.
(Continued)

*Primary Examiner* — Javier A Pagan
(74) *Attorney, Agent, or Firm* — CANTOR COLBURN LLP

(57)            ABSTRACT

In accordance with at least one aspect of this disclosure, a life support system (LSS) for a spacecraft includes a gas accumulator configured to store a gas, the gas accumulator including a non-metallic inner lining. A fluid processor is fluidly connected to the gas accumulator configured to produce one or more life sustaining fluids from at least the gas. A supply conduit can be fluidly connected to the fluid processor configured to supply the one or more life sustaining fluids to one or more portions of the spacecraft.

15 Claims, 2 Drawing Sheets

(52) U.S. Cl.
CPC .. *F17C 2221/014* (2013.01); *F17C 2221/033*
(2013.01); *F17C 2270/0194* (2013.01); *F17C*
*2270/025* (2013.01)

(56) References Cited

U.S. PATENT DOCUMENTS

| | | | |
|---|---|---|---|
| 8,586,253 | B2 | 11/2013 | Hibbs et al. |
| 8,987,409 | B2 | 3/2015 | Mazabraud et al. |
| 9,302,437 | B2 | 4/2016 | Radtke |
| 9,829,154 | B2 | 11/2017 | Clark et al. |
| 2004/0188445 | A1 | 9/2004 | Debecker et al. |
| 2022/0065398 | A1 | 3/2022 | Lambourne |
| 2022/0112984 | A1 | 4/2022 | Blackhouse et al. |
| 2022/0325851 | A1 | 10/2022 | Sonnen et al. |

FOREIGN PATENT DOCUMENTS

| | | | | |
|---|---|---|---|---|
| EP | 3786511 A1 | * | 3/2021 | ............... F17C 1/06 |
| JP | 2005281198 A | * | 10/2005 | |

OTHER PUBLICATIONS

Abstract of JP2005281198 (A); Published: Oct. 13, 2005, 1 page.
Azeem et al. "Application of Filament Winding Technology in Composite Pressure Vessels and Challenges: A review", Journal of Energy Storage, vol. 49, Feb. 10, 2022, 22 pages.
European Search Report for Application No. 23202195.6, mailed Feb. 1, 2024, 9 pages.
Machine Translation of CN104152197 (A); Published: Nov. 19, 2014, 9 pages.
Machine Translation of JP2005281198 (A); Published: Oct. 13, 2005, 12 pages.

* cited by examiner 122c
122b
122c
122b
122c
122b
108, 122a

GAS STORAGE ACCUMULATORS FOR SPACECRAFT

TECHNICAL FIELD

The present application relates to gas storage accumulators, and more particularly to gas storage accumulators for spacecraft.

BACKGROUND

Crewed spacecraft, such as the international space station (ISS) and other spaceflight (including those that will be used for space commercialization and space tourism) require pressurized gas storage such as hydrogen (H2), oxygen (O2) and metabolic carbon dioxide (CO2) for supporting crew life aboard the spacecraft. However, certain gases in the presence of moisture can form corrosive agents within the gas storage accumulator or causing material embrittlement which lead to a shorter lifespan of the accumulator. This can lead to further issues such as gas leakage, which is a form of structural failure of the gas storage tank or accumulator. Such gas leakage can cause safety concerns aboard the spacecraft.

There remains a need in the art for improved reliability of gas storage accumulators, e.g., in the aerospace industry. This disclosure provides a solution for this need.

SUMMARY

In accordance with at least one aspect of this disclosure, a life support system (LSS) for a spacecraft includes an accumulator configured to store a first fluid, the accumulator including a non-metallic polymeric inner lining. A fluid processor is fluidly connected to the accumulator configured to produce one or more life sustaining second fluids from at least the first fluid. A supply conduit can be fluidly connected to the fluid processor configured to supply the one or more life sustaining second fluids to one or more portions of the spacecraft, such as the crew air cabin. In embodiments, the first fluid can be a gas or a liquid.

In embodiments, the accumulator can include a storage tank formed from at least three layers, wherein the non-metallic inner lining is an inner most layer of the storage tank. In certain embodiments, the non-metallic inner lining can include a thermoplastic polymeric lining. In certain embodiments, the thermoplastic polymeric lining can include high-density polyethylene (HDPE) or other thermoplastic elastomers. In certain embodiments, the thermoplastic polymeric lining includes carbon fiber, for example carbon fiber reinforced polymer (CFRP).

In certain embodiments, the non-metallic inner lining can be chosen so as not to react with the fluid contained within the walls of the gas accumulator. In certain embodiments, the non-metallic inner lining can be resistant to chemical reactions occurring within the accumulator. In embodiments, the fluid can include a gas stored within the accumulator, the gas can include at least one of hydrogen (H2), oxygen (O2), nitrogen (N2), methane (CH4), and/or metabolic carbon dioxide (CO2). In certain embodiments, the fluid processor can include a reactor configured to perform a Sabatier reaction. In certain embodiments, the one or more life sustaining fluids can include water (H20). In certain embodiments, the one or more life sustaining fluids can include a breathing air mixture of oxygen (O2) and nitrogen (N2) for spacecraft crew.

In certain embodiments, an outermost layer of the storage tank can include a polymeric layer wrapped in a first wrap direction. In certain embodiments, a middle layer of the storage tank can include a polymeric layer wrapped in a second wrap direction different from the first wrap direction. In such embodiments, the outer most layer and the middle layer can include carbon fibers (CF), and the first wrap direction and second wrap direction can be oriented relative to one another such that the accumulator is configured to withstand a pressure within the storage tank.

In embodiments, the accumulator can further include a boss configured to interface the supply conduit with the accumulator. In certain embodiments, the boss can include a valve for controlling flow of the first fluid into the accumulator and/or flow of the first fluid out of the accumulator. In certain embodiments, the boss can be metallic, and in certain embodiments can include a corrosion-resistant metal.

In accordance with at least one aspect of this disclosure, a non-metallic storage accumulator can be configured to house pressurized fluid aboard a spacecraft for use as a life sustaining fluid for a human (viz. crew members) aboard the spacecraft. In embodiments, the storage accumulator can include a first non-metallic layer, a second non-metallic layer, and a third non-metallic layer. In certain embodiments, at least one of the first, second, or third non-metallic layers includes carbon fiber. In embodiments, an innermost layer of the storage accumulator having direct contact with the pressurized fluid can include at least HDPE or other thermoplastic elastomers.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
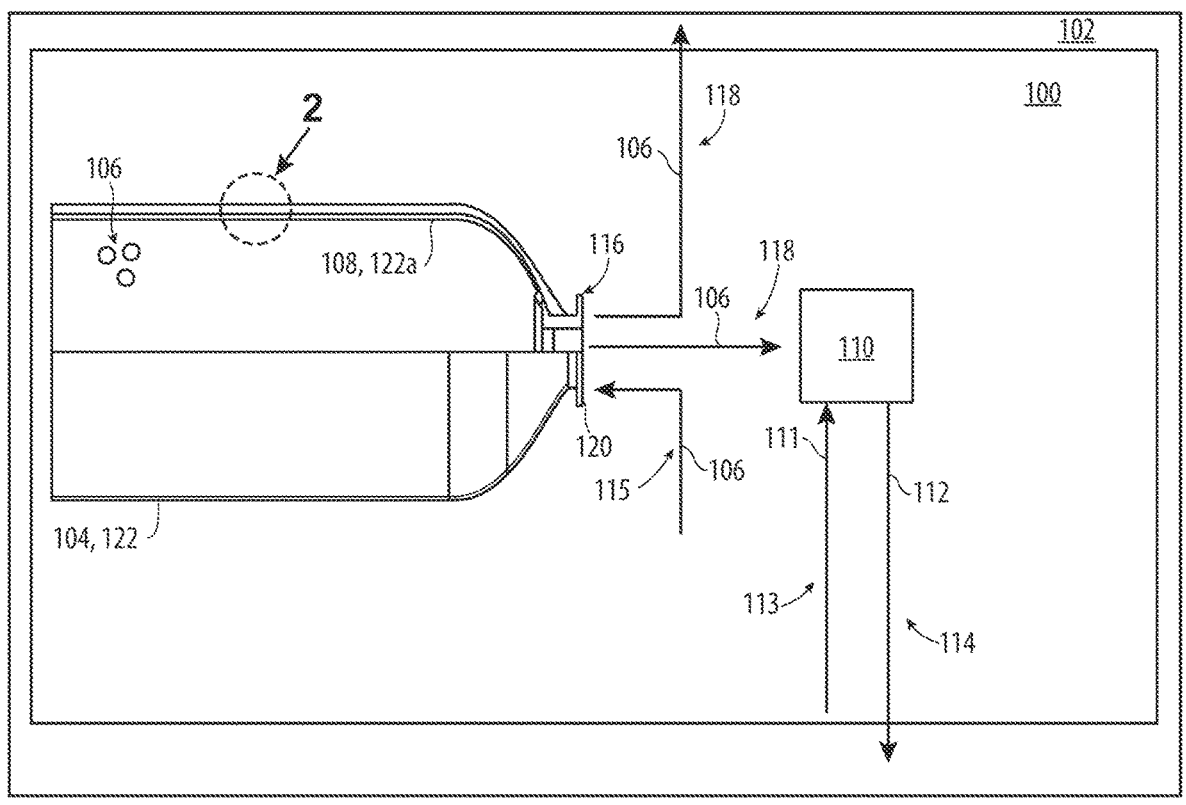
FIG. 1 is a schematic diagram of a system in accordance with this disclosure, showing a LSS within a spacecraft.
Figure 2:
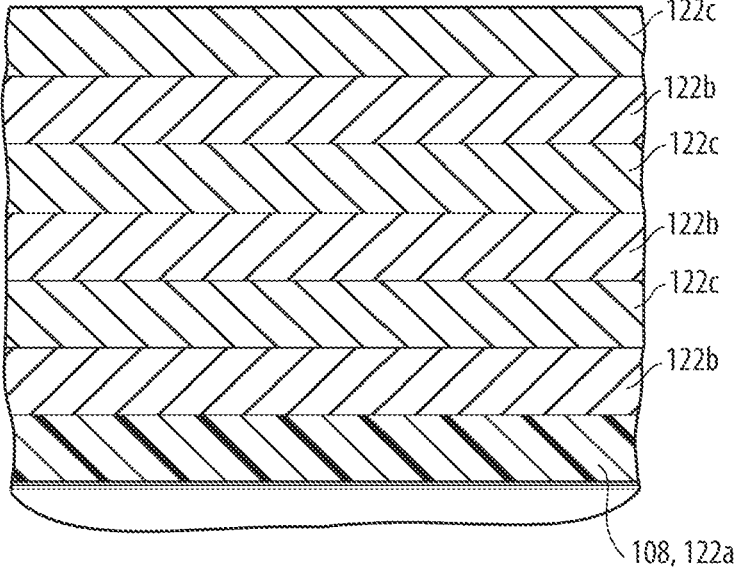
FIG. 2, is an enlarged partial view of a gas storage accumulator of the LSS of FIG. 1.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2. Certain embodiments described herein can be used to improve fluid storage aboard spacecraft.

In accordance with at least one aspect of this disclosure, a life support system (LSS) 100 for a crewed spacecraft 102 can include a accumulator 104 configured to store a first fluid 106, the accumulator 104 including at least non-metallic inner lining 108 (e.g., as shown enlarged in FIG. 2). A fluid processor 110 (e.g., a reactor) can be fluidly connected to the accumulator 104 configured to produce one or more life sustaining second fluids 112 from at least the first fluid 106. One or more additional fluids or reagents 111 can be added directly to the fluid processor 110 from any suitable source, e.g., additional fluid accumulators (not shown) via conduit 113. At least one supply conduit 114 can be fluidly connected to the fluid processor 110 configured to supply the one or more life sustaining fluids 112 to one or more portions of the spacecraft 102 for use by spacecraft crew, or for use by the spacecraft itself. It is contemplated that the LSS 100 can support human or laboratory animal life aboard the spacecraft 102 during manned missions. During unmanned missions, embodiments of the system 100 can support operation the spacecraft 102.

In embodiments, the accumulator 104 can further include a boss configured to interface a second supply conduit 118 with the accumulator 104 to supply fluid 106 to the fluid processor 110 or any other portion of the spacecraft 102 where such gas may be needed. In certain embodiments, the boss 116 can include a valve 120 for controlling flow of the fluid 106 into the accumulator 104 (e.g., via conduit 115 during filling) and/or flow of the gas 106 out of the gas accumulator 104 (e.g., via conduit 118 when supplying fluid to the fluid processor 110 or the spacecraft 102). In certain embodiments, the boss 116 can be metallic.

Referring now to FIGS. 1 and 2, in embodiments, the accumulator 110 can include a storage tank 122 formed from at least three layers 122a, 122b, 122c, wherein the non-metallic inner lining 108 is an inner most layer 122a of the storage tank 122. In certain embodiments, the non-metallic inner lining 108, 122a can include a thermoplastic polymeric lining. In certain the thermoplastic polymeric lining can include high-density polyethylene (HDPE) or other thermoplastic elastomers. In certain embodiments, the thermoplastic polymeric lining includes carbon fibers.

In certain embodiments, for example as shown more clearly in FIG. 2, an outermost layer 122c of the storage tank 122 can include a polymeric layer wrapped in a first wrap direction. In certain embodiments, a middle layer 122b of the storage tank includes a polymeric layer wrapped in a second wrap direction different from the first wrap direction. In such embodiments, the outer most layer 122c and the middle layer 122b can include carbon fibers, and the first wrap direction (e.g., a helical wrap) and second wrap direction (e.g., a hoop wrap) can be oriented relative to one another such that the accumulator 104, 122 is configured to withstand a pressure within the storage tank 122. For example, the first wrap direction can be perpendicular to the second wrap direction. In certain embodiments, the first wrap direction can be between perpendicular and parallel to the second wrap direction. Any suitable number of additional layers can be included in any suitable orientation is contemplated herein to achieve a desired accumulator strength to withstand a pressure of a given fluid within the accumulator 104 (e.g., a plurality of layers wrapped in the first direction can be interleaved with a plurality of layers wrapped in the second direction).

In certain embodiments, the non-metallic inner lining 108, 122a can be selected such that it is not reactive with the fluid 106 stored within the accumulator. In certain embodiments, the non-metallic inner lining 108, 122a can be resistant to potential chemical reactions occurring within the accumulator 104, 122 (e.g., between the stored fluid 106 and humidity within the tank 104,122).

In embodiments, the fluid 106 stored within the accumulator 104,122 can be a gas and can include at least one of hydrogen (H2), oxygen (O2, nitrogen (N2), methane (CH4), and/or carbon dioxide (CO2). In certain embodiments, the reactor 110 can be a Sabatier reactor configured to perform a Sabatier reaction to generate water (H2O) and methane (CH4) from at least carbon dioxide (CO2) stored in the gas accumulator 104, 122. In certain embodiments, the one or more life sustaining fluids 112 can include water (e.g., produced via the Sabatier reaction). In certain embodiments, the one or more life sustaining fluids 112 can include a breathing air mixture (e.g., one or more gases in a mixture similar to that of air on earth) for spacecraft crew.

In embodiments, the fluid 106 stored in the accumulator 104,122 can be a liquid. In certain such embodiments, the liquid can include a cooling liquid such as ammonia (NH3), propylene glycol (PGW), and/or HFE7200 and the fluid processor 110 can include an active thermal control system (ATCS) onboard the spacecraft 102. In certain embodiments, the fluid 106 can be a liquid and can include water and the fluid processor 110 can include a water processing assembly (WPA) onboard the spacecraft 102. In such embodiments where the fluid 106 includes a liquid, the non-metallic lining can include polyethylene terephthalate plastic or polyamide plastic, for example.

In accordance with at least one aspect of this disclosure, a non-metallic storage container (e.g., accumulator 104/storage tank 122) can be configured to house pressurized fluid (e.g., gas 106) aboard a spacecraft (e.g., spacecraft 102) for use as a life sustaining fluid for a crew member aboard the spacecraft (e.g., human or animal). In embodiments, the storage accumulator can include a first non-metallic layer (e.g., layer 122a), a second non-metallic layer (e.g., layer 122b), and a third non-metallic layer (e.g., layer 122c). In certain embodiments, at least one of the first, second, or third non-metallic layers can include carbon fiber (CF), and in certain embodiments, all of the first, second, and third non-metallic layers can include carbon fiber. In certain embodiments, at least one layer, e.g., an innermost layer of the storage tank which has direct contact with the pressurized fluid can include at least HDPE.

Conventional gas storage accumulators aboard spacecraft include type-III containers which can have metallic liners such as aluminum (Al) or stainless steel (SS). However, such metallic containers are heavier than the accumulators as described herein. Further, metallic tanks can become embrittled (as a result of contacting H2 gas) or oxidized (viz., corroded) or pitted when the gas stored within reacts with certain other fluids present, such as humidity or moisture in the accumulator. Embrittlement of the storage accumulator can then weaken the mechanical properties of the accumulator's walls raising a safety concern for those on board the spacecraft. Certain conditions may case formation of a corrosive environment inside the gas storage accumulator is CO2 gas, which when dissolved in water (e.g., in the form of moisture/humidity) form the corrosive carbonic acid (H2CO3). Another example of a corrosive environment can include formation of oxidative gas, for example when 02 gas when comes in contact with the metallic walls (i.e., the material of construction) of the storage accumulator if a conventional tank is used. Gaseous oxygen (O2) is generated in the so-called Oxygen Generation Assembly (OGA) onboard the spacecraft. Certain gases may also cause degradation in the mechanical properties of accumulator material, for example H2, which can cause the embrittlement phenomenon when H2 comes in contact with certain metallic walls of the storage accumulators if a conventional tank is used. Using type-IV accumulators (e.g., as described herein) can eliminate material compatibility issues, such as corrosion caused by O2 gas or carbonic acid (H2CO3 which results from dissolution of CO2 in H2O). The liner (e.g., high-density polyethylene (HDPE) in certain embodiments, can reduce or eliminate the corrosion hazard and hydrogen embrittlement hazard because it removes the possibility for any gases in the tank, or corrosive environments to interact with a metallic surface.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of examples, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A life support system (LSS) for a crewed spacecraft, comprising:
   an accumulator configured to store a first fluid, the accumulator including a non-metallic inner lining;
   a fluid processor fluidly connected to the accumulator configured to produce one or more life sustaining second fluids from at least the first fluid; and
   a first supply conduit configured to supply the one or more life sustaining second fluids to one or more portions of the spacecraft;
   a second supply conduit;
   a boss configured to interface the second supply conduit with the accumulator, the second supply conduit being configured to supply the first fluid to the fluid processor and an other portion of the spacecraft.

2. The life support system of claim 1, wherein the accumulator includes a storage tank formed from at least three layers, wherein the non-metallic inner lining is an inner most layer of the storage tank.

3. The life support system of claim 2, wherein the non-metallic inner lining includes a thermoplastic polymeric lining.

4. The life support system of claim 3, wherein the thermoplastic polymeric lining includes high-density polyethylene (HDPE).

5. The system of claim 3, wherein the thermoplastic polymeric lining includes carbon fibers.

6. The life support system of claim 2, wherein the non-metallic inner lining is not reactive with the first fluid stored within the accumulator.

7. The life support system of claim 6, wherein the gas stored within the accumulator includes at least one of: hydrogen (H2), oxygen (O2), nitrogen (N2), methane (CH4) and/or carbon dioxide (CO2).

8. The life support system of claim 7, wherein the fluid processor includes a reactor configured to perform a Sabatier reaction.

9. The life support system of claim 8, wherein the one or more life sustaining fluids includes H2O.

10. The life support system of claim 7, wherein the one or more life sustaining fluids includes a breathing air mixture for spacecraft crew.

11. The life support system of claim 2, wherein an outermost layer of the storage tank includes a polymeric layer wrapped in a first wrap direction.

12. The life support system of claim 11, wherein a middle layer of the storage tank includes a polymeric layer wrapped in a second wrap direction different from the first wrap direction.

13. The life support system of claim 12, wherein the outer most layer and the middle layer include carbon fibers, wherein the first wrap direction and second wrap direction are oriented relative to one another such that the gas accumulator is configured to withstand a pressure within the accumulator.

14. The life support system of claim 1, wherein the boss includes a valve for controlling flow of the first fluid into the accumulator and/or flow of the first fluid out of the accumulator.

15. The life support system of claim 14, wherein the boss is metallic.

* * * * *